March 27, 1951

F. J. MILLER ET AL 2,546,900

TIRE RIM REMOVER WITH CIRCUMFERENTIALLY
DISTRIBUTED THRUST

Filed June 27, 1947

INVENTORS
Fred J. Miller,
and
Merle J. Graham
BY
Ernest J. Mechlin
Their Attorney.

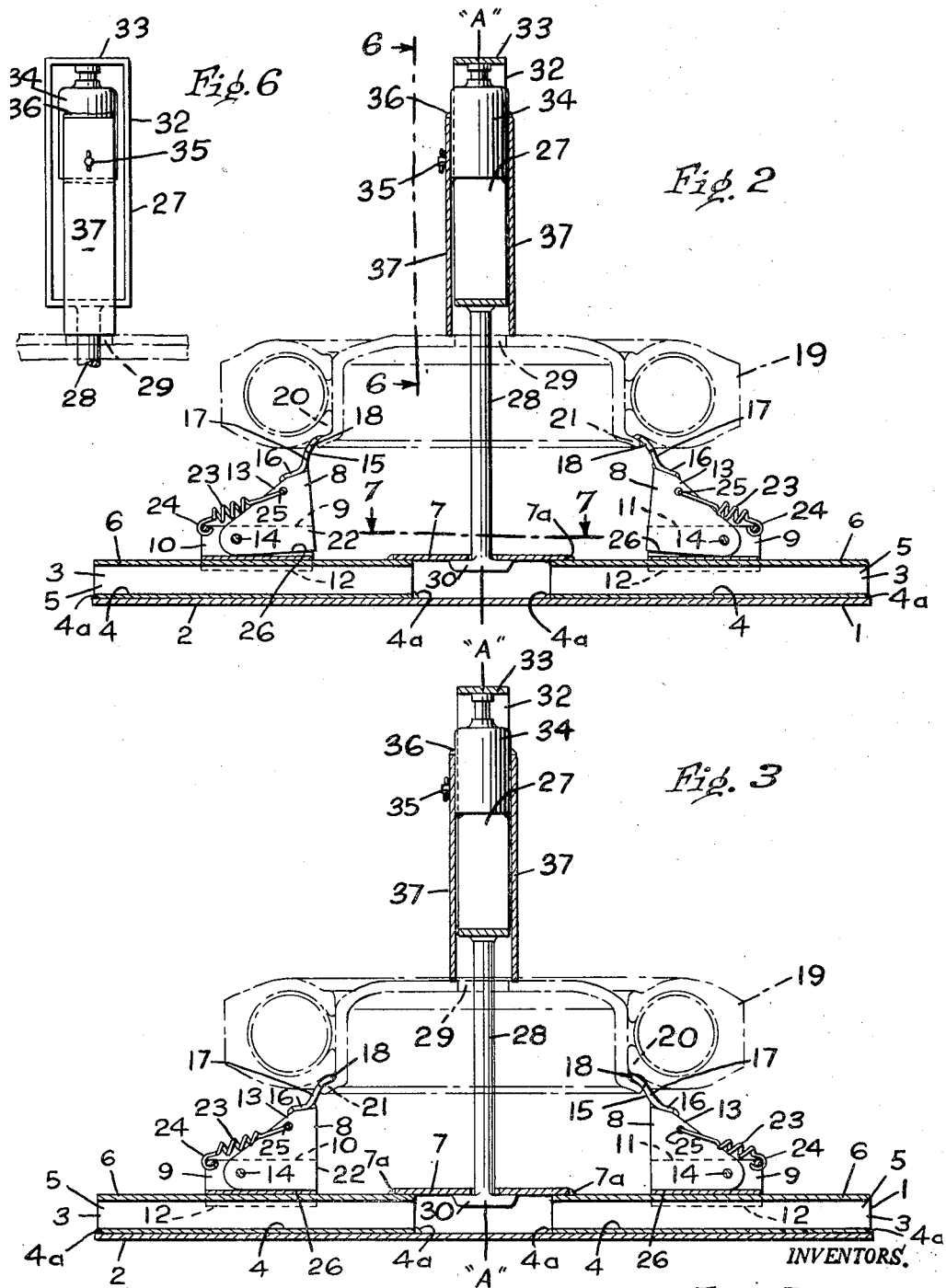

Patented Mar. 27, 1951

2,546,900

UNITED STATES PATENT OFFICE 2,546,900

TIRE RIM REMOVER WITH CIRCUMFERENTIALLY DISTRIBUTED THRUST

Fred J. Miller and Merle J. Graham, Dickinson, N. Dak.

Application June 27, 1947, Serial No. 757,362

4 Claims. (Cl. 157—1.2)

This invention pertains to a tire iron and more particularly to a type thereof whereby a tire carcass can be removed from a tire rim.

An object of the invention is the provision of a novel or improved tire iron which is portable, durable and rugged in construction, easily manipulated, positive in action and of inexpensive manufacture.

Another object of the invention is the provision, in a tire iron, of adjustable means rendering the tire iron adaptable for tires of different sizes.

A further object of the invention is the provision of a removable hydraulic means in an improved tire iron and arranged to urge a tire carcass from a rim thereof.

The above and numerous other objects will become apparent from the succeeding description when considered together with the accompanying drawings, wherein:

Figure 2 is a cross sectional view taken along the lines 2—2 of Figure 1, looking in the direction of the arrows.

Figure 3 is a cross sectional view somewhat similar in showing to Figure 2 but differing therefrom by a change in relationship of parts of the tire iron.

Figure 6 is a side elevational view taken along the lines 6—6 of Figure 2, looking in the direction of the arrows.

Figure 1:
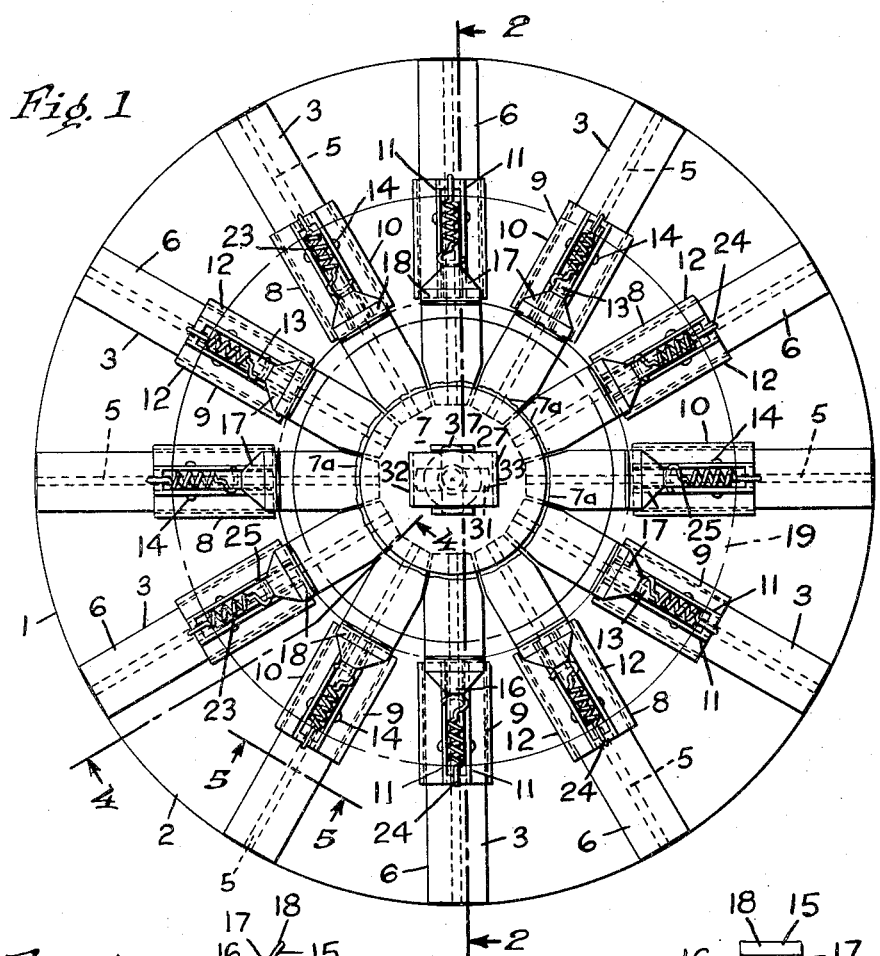
Figure 1 is a plan or top view of a tire iron embodying the present invention.
Figure 4:
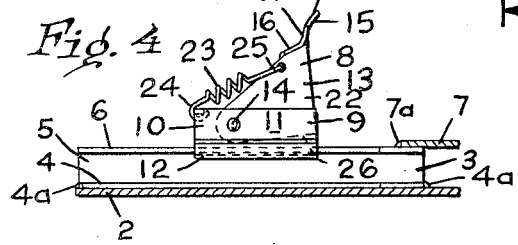
Figure 4 is a vertical sectional view taken along the lines 4—4 of Figure 1, looking in the direction of the arrows.
Figure 5:
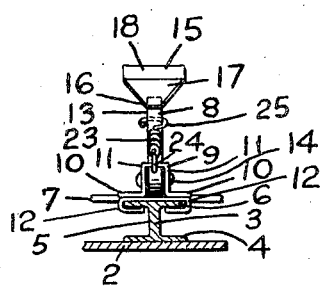
Figure 5 is a vertical sectional view taken along the lines 5—5 of Figure 1, looking in the direction of the arrows.

Referring now in detail to the drawings, wherein like reference characters designate like parts, the numeral 1 is employed to designate, in a somewhat general manner, a tire tool exemplary of the present invention. When a tire change is required in connection with a passenger vehicle wherein relatively light and small tires are employed there is very rarely any great difficulty encountered. However, there is an extremely different and difficult problem encountered with heavy and large tractor and truck tires. The conventional hand tire iron does not present a means affording sufficient leverage, even when operated by an individual of abnormal strength and skill, to break the tire loose from the rim.

With the above thoughts in mind as a background, a clearer understanding and appreciation of the following detailed description of the illustrated form of the invention will be realized.

The tire iron under consideration is of a type which is movable to the extent that it may be moved from one desired location to another and as such comprises a bed plate 2 of circular configuration and of sufficient thickness or rigidity to afford an adequate foundation upon which the remaining component parts of the tire iron may be mounted. Arranged radially on the bed plate are a series or plurality of tracks or rails 3 of I shape in configuration for the purpose to be hereinafter made apparent. Each rail arranged as a spoke of a wheel starts at or near the periphery of the bed plate and terminates short of what will hereinafter be termed or classified as the vertical axis of the tire iron which is designated as a diagrammatic line in the drawings (see Figures 2 and 3) and lettered A—A. As previously indicated each rail or track comprises a bottom flange 4 bearing directly upon the plate and secured thereto by any desired means such as the illustrated welds 4a. Upstanding from each bottom flange is an intermediate web 5 which terminates in a top flange or head 6, the latter of which is spaced a desired or predetermined distance above its companion bottom flange and presents a true or flat bearing area and guide means. Bridging the inner ends of the combined rails is an anchor plate 7 also of circular configuration and overlapping the rails sufficiently to present an adequate bearing therebetween. The anchor plate rests directly upon the rail top flanges and welds 7a are employed to secure the anchor plate firmly to the rails.

Movably mounted on each rail is a tire spanner 8 arranged for manual movement along a related rail toward or away from the vertical axis of the tire iron. Each spanner comprises a frame 9 made up of counter part clips 10 each of which is formed by a vertical flange or rib 11 terminating adjacent its lower extremity in a U-shaped clasp or foot 12 arranged to neatly accommodate a portion of a related rail top flange. By this arrangement or configuration when two such clips are assembled they form a frame interlocked with a rail and arranged for adjustment relative to a related rail longitudinally thereof. Mounted between a mated or related pair of frame clips is a brace or pillar 13 of triangular configuration and of sufficient thickness to add stability thereto for the superimposed load to which it will be subjected in service. Adjacent to an apex of each triangular brace there is provided a pivot pin 14 which spans the distance between and extends through the frame vertical flanges or ribs to be secured thereto by any desired manner or fashion. The pins pivotally mount the braces to the frames for the purpose to be hereinafter made apparent. Mounted on top of each pillar is a finger or tong 15 of substantially flattened Z shape in configuration and of appreciable breadth and to this extent each tong comprises a foot or bottom leg 16 welded or otherwise secured to a related pillar. Extending diagonally upwardly toward the vertical axis of the tire iron from an extremity of each bottom leg is an intermediate fin 17 which termintaes in an angularly and inwardly directed flattened bit or spade 18 to thus, in an assemblage, present a plurality of intermittently or radially spaced means directly upon which a tire carcass 19 may rest or bear. As viewed particularly in Figure 2 of the drawings it will be noted that the bits 18 not only function as supports for a tire but in normal position they are arranged to be poised at the juncture formed by the tire beading 20 and a flange or lip 21 of a rim; the tire and rim being illustrated diagrammatically since they form no part of the present invention. It will also be here noted that a leading edge 22 of each pillar is disposed out of the vertical range of the tire rim so as to permit the rim to be moved beyond the embrace of the tire. In order to hold the fingers in a normal or somewhat elevated position and further to afford a means whereby the fingers may, at certain operating movements, be moved toward the vertical axis of the tire iron, a resilient means is employed. Such resilient means is characterized in the drawings by a coil, tension or helical spring 23 which has one end 24 thereof mounted on a related frame and the other end 25 thereof secured to a companion brace. By reason of the inherent tension in each coil spring the fingers are held elevated and poised so that as the tire and rim assemblage is moved downwardly the fingers will move in an arc about the pins 14 and be urged or forced between the tire beading and rim flange as clearly illustrated in Figure 3 of the drawings to break the bond therebetween. This pivotal movement will continue until a bottom surface 26 of each brace comes to rest solidly against the frame at which time the pivotal movement ceases and any additional pressure on the tire rim will cause a separation movement between the tire and rim.

Figure 7:
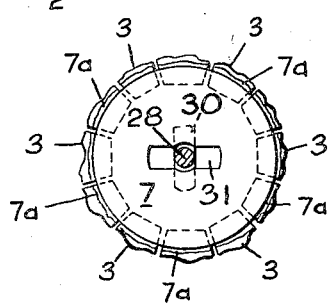
Figure 7 is a view taken along a horizontal plane corresponding to the lines 7—7 of Figure 2, and looking in the direction of the arrows.

While various means may be employed to impart force to the rim the presently preferred means is in the nature of a hydraulic mechanism and toward this end there is disposed, in a vertical manner on the vertical axis of the tire iron, an anchor or extension 27 formed in part by a stem 28 which projects through the existing opening 29 of the tire rim. The lower end of the stem has formed thereon a crosshead 30 which underlies the anchor plate 7. Since the crosshead is preferably formed integrally with the stem the anchor plate has formed therein an elongated opening 31 which is designed to receive and allow the crosshead to pass therebeyond. After inserting the crosshead into the elongated opening the former is rotated ninety degrees to thereby lock the stem in place (see Figure 7). The upper extremity of the stem has a strap-like bail or yoke 32 firmly secured thereto and projecting upwardly or in a vertical direction to have an upper extremity formed as a roof 33. Disposed within the confines of the yoke is a hydraulic means or jack 34 illustrated in Figure 2 as being nearly collapsed and in Figure 3 as partially extended. This hydraulic jack is provided with a fitting 35 to which a coupling (not shown) leading from a source of fluid pressure may be attached and for the purpose of expanding or contracting the hydraulic jack as required. Firmly attached to the jack by means of welds 36 is a pair of stanchions or posts 37 projecting downwardly in parallel relation from the jack and rest upon or end abutting the tire rim. When fluid pressure is admitted to the hydraulic jack the latter will react against the yoke head to pull the stem crosshead tight against the anchor plate and a continued expansive movement of the jack will result in the post being urged downwardly and thereby force the tire rim axially away from the tire.

From the above it will be noted that various changes and alterations may be made to the structure of the accompanying drawing as described herein without departing from the spirit of this invention and scope of the appended claims.

We claim:

1. In a tire tool, the combination of, a horizontal base, a plurality of tracks on said base radially arranged about a vertical axis of said tool, each of said tracks having a radially adjustable spanner, each of said spanners comprising a frame interlocking with and freely slidable relative to a related track, brace means carried by each frame, finger means upstanding from said brace means and extending beyond said brace means toward said vertical axis, said brace means having a leg underlying said finger means and disposed substantially parallel to said axis, said leg having a lower face adapted to engage a confronting face of said frame, and said brace means being pivotally mounted on said frame outwardly of said leg, spring means joining each brace means and associated frame for drawing said finger means away from said axis and said lower face out of engagement with said confronting face, said finger means being arranged to underlie a tire beading and overlie a tire rim flange, and means anchorable to said base for applying pressure to a tire rim for urging the lower face of said legs of said braces downwardly solid against said base and forcing said rim flange away from said finger means and tire beading.

2. In a tire tool, the combination of, a horizontal base, a plurality of tracks on said base radially arranged about a vertical axis of said tool, each of said tracks having a radially adjustable spanner, each of said spanners comprising a frame interlocking with and freely slidable relative to a related track, triangular shaped brace means carried by each frame, finger means upstanding from said brace means and extending beyond said brace means toward said axis, said triangular brace means having a leg underlying said finger means and disposed substantially parallel to said axis and a base leg disposed substantially normal to said first-named leg and engageable with a confronting face of said frame, and said brace means being pivotally mounted on said frame outwardly of said first-named leg, spring means connecting said brace means and frame and normally urging said finger means away from said axis and said base leg upwardly from said confronting face, said finger means being arranged to underlie a tire beading and overlie a tire rim flange, and hydraulic means removably anchored to said brace for applying pressure to said tire rim for urging said base legs of said braces downwardly solid against said base and forcing said rim flange away from said finger means and tire beading.

3. In a tire tool, the combination of, a horizontal base, a plurality of tracks on said base radially arranged about a vertical axis of said tool, each of said tracks having a radially adjustable spanner, each of said spanners comprising a frame interlocking with and freely slidable relative to a related track, triangular shaped brace means carried by each frame, finger means upstanding from said brace means and extending beyond said brace means toward said axis, said triangular brace means having a leg underlying said finger means and disposed substantially parallel to said axis and a base leg disposed substantially normal to said first-named leg and engagable with a confronting face of said frame, and said brace means being pivotally mounted on said frame outwardly of said first-named leg, spring means connecting said brace means and frame and normally urging said finger means away from said axis and said base leg upwardly from said confronting face, said finger means being arranged to underlie a tire beading and overlie a tire rim flange, and hydraulic means including a yoke having an elongated cross-member formed on an extension thereof and insertible in an axial opening of like configuration in said base, said cross-member on being turned relative to said base removably anchoring said hydraulic means thereto, and said anchored hydraulic means being adapted to apply pressure to a tire rim for urging said base legs of said braces downwardly solid against said base and forcing said rim flange away from said finger means and tire beading.

4. In a tire tool having a base, a plurality of tracks on said base radially arranged about an axis of said tool, and a spanner interlocking with and slidable along each of said tracks, the combination of hydraulic means comprising a yoke for seating a hydraulic jack, an extension on said yoke, an elongated cross-head on said extension, said cross-head being insertible in an opening of like configuration in said base and on partial turning removably anchoring said yoke to said base, and force-transmitting means connected to said jack for applying pressure to a tire rim for urging a tire against said spanners and removing said tire from said rim.

FRED J. MILLER.
MERLE J. GRAHAM.

REFERENCES CITED

The following references are of record in the file of this patent:

UNITED STATES PATENTS

| Number | Name | Date |
|---|---|---|
| 1,481,061 | Hunter | Jan. 15, 1924 |
| 1,724,813 | Weaver et al. | Aug. 13, 1929 |
| 2,423,652 | Kelley | July 8, 1947 |
| 2,436,003 | Gosselin | Feb. 17, 1948 |

FOREIGN PATENTS

| Number | Country | Date |
|---|---|---|
| 492,552 | Germany | Feb. 25, 1930 |